United States Patent [19]

Reynolds

[11] Patent Number: 4,715,356
[45] Date of Patent: Dec. 29, 1987

[54] GAS BURNER WITH HEAT REFLECTIVE RADIANTS FOR CONTROLLED HEAT CONCENTRATION

[76] Inventor: Howard S. Reynolds, 1192 Mitchell Ave. No. 50, Tustin, Calif. 92680

[21] Appl. No.: 4,669

[22] Filed: Jan. 20, 1987

Related U.S. Application Data

[63] Continuation-in-part of Ser. No. 759,160, Jul. 26, 1985, abandoned.

[51] Int. Cl.$^4$ .............................................. F24C 3/00
[52] U.S. Cl. ................ 126/39 H; 126/39 K; 126/214 R
[58] Field of Search ............... 99/422, 425; 126/39 H, 126/39 J, 39 K, 39 N, 214 R, 214 C, 214 D

[56] References Cited

U.S. PATENT DOCUMENTS 900,998 10/1908 Grady ............................. 126/214 R
1,764,719 6/1930 Gercich ........................... 126/39 K
2,216,851 10/1940 Meacham et al. ................ 126/39 H

*Primary Examiner*—Samuel Scott
*Assistant Examiner*—Noah Kamen
*Attorney, Agent, or Firm*—William H. Maxwell

[57] ABSTRACT

A gas stove burner-combustion chamber, the burner supplied with gas and with primary air from a primary intake plenum and disposed at the top of a secondary intake plenum having opposite side baffles closely spaced from the burner, divergent radiants extending upward from the baffles and sealed at the underside of a griddle plate and thereby forming an isolated combustion chamber open to a flue, and there being a plurality of said burner-combustion chambers arranged adjacently parallel with space therebetween occluded beneath the griddle plate, the burners being individually controlled for temperature variation at different areas of the griddle plate.

18 Claims, 10 Drawing Figures

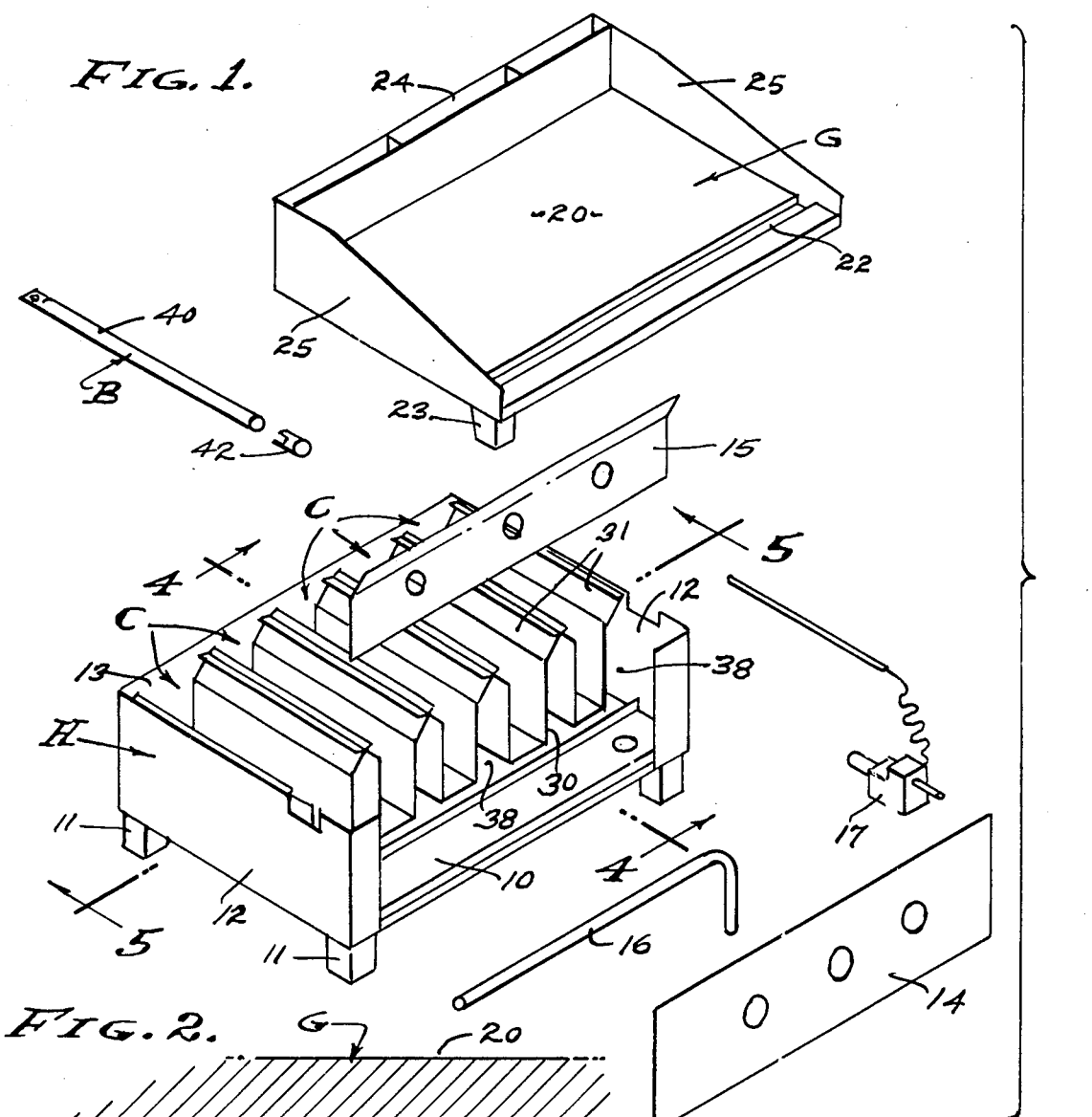
FIG. 1.
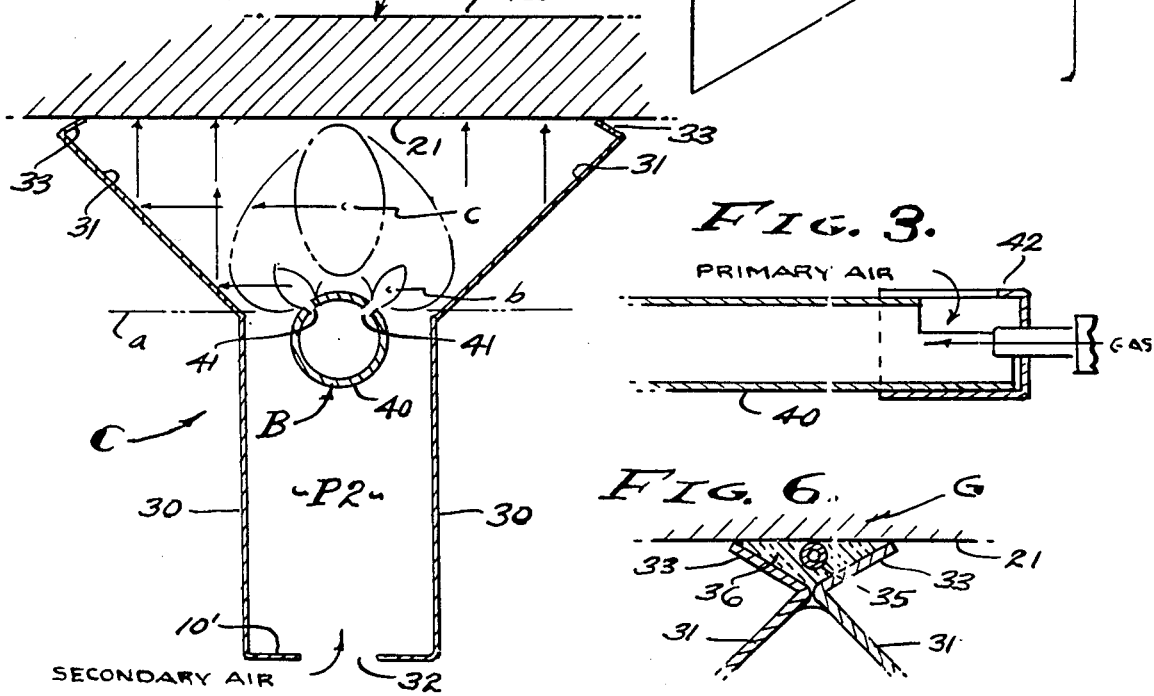
FIG. 2.
FIG. 3.
FIG. 6.

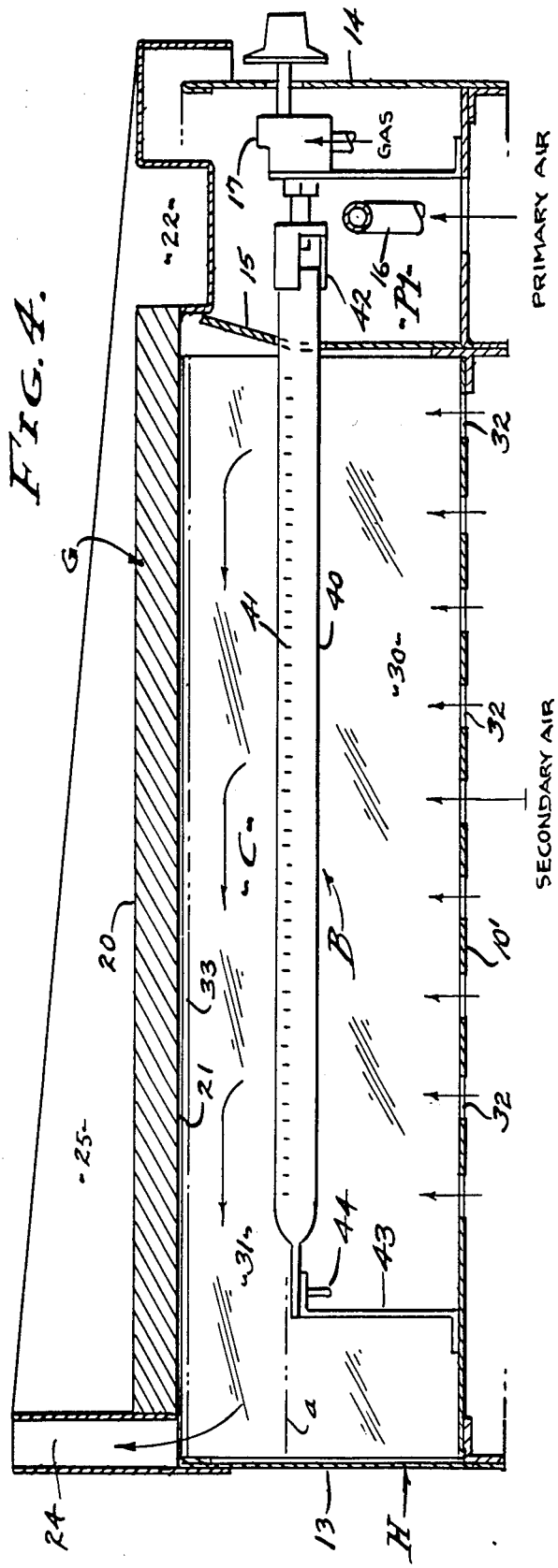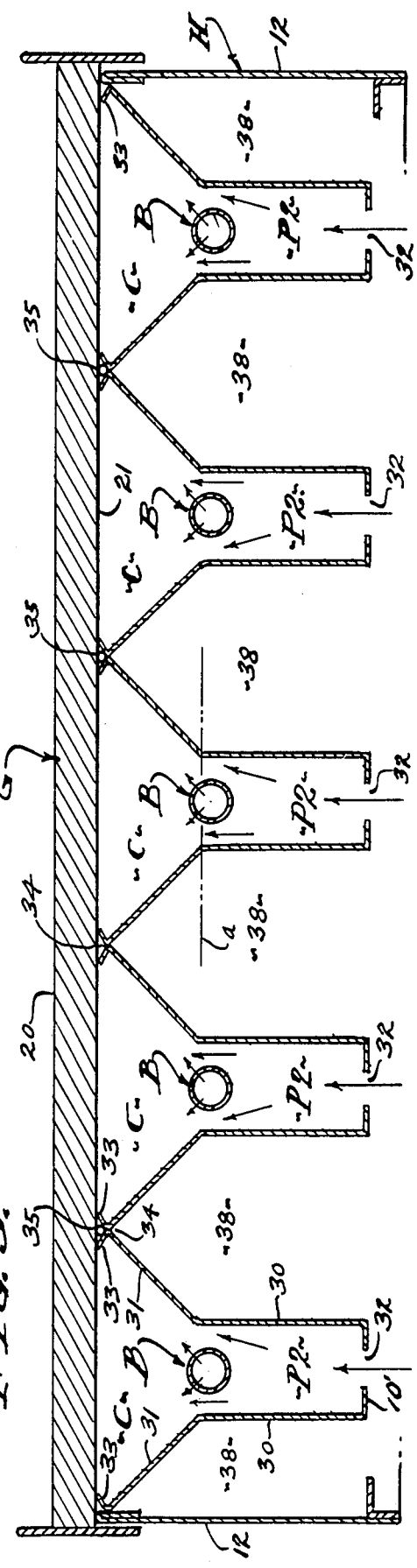

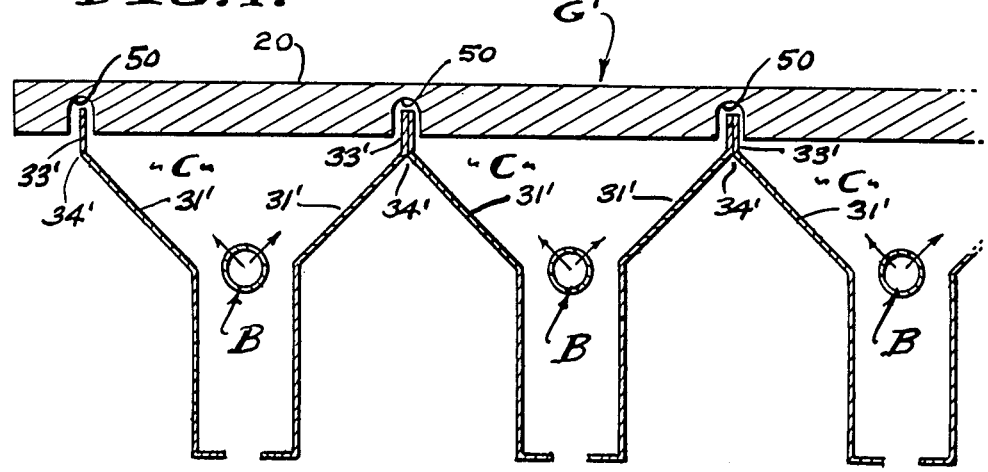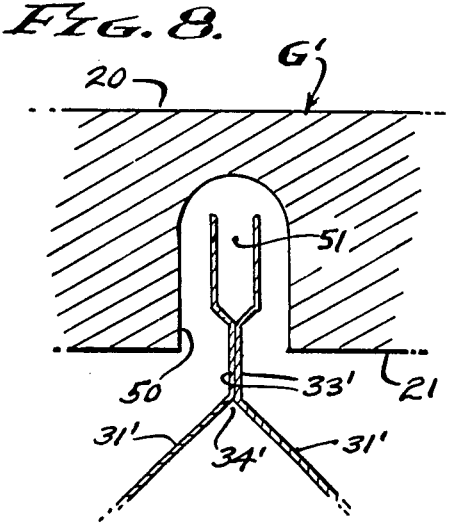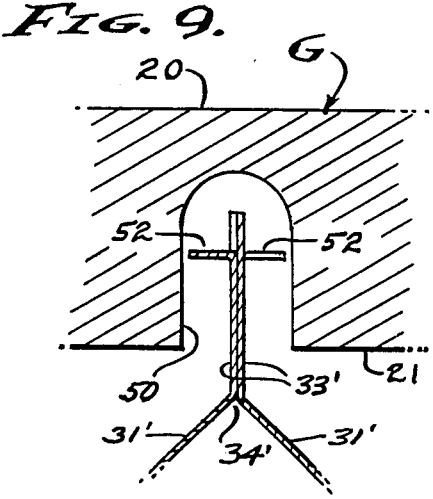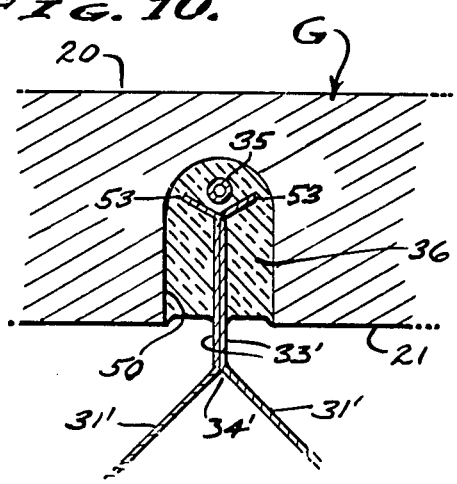

GAS BURNER WITH HEAT REFLECTIVE RADIANTS FOR CONTROLLED HEAT CONCENTRATION

This application is a continuation in part of my previously filed and finally allowed application Ser. No. 759,160, filed July 26, 1985, now abandoned.

BACKGROUND

This invention relates to the top burners of ranges and particularly to griddles and heat control thereof by means of a new and useful Gas Burner With Heat Reflective Radiants For Controlled Heat Concentration. Heretofore, griddle plates used in commercial kitchens have been fired by gas to one general heat level applied coextensively beneath the plate. In practice, there are situations where variation in heat level is desired at different areas of the griddle plate, and attempts at controlled variations in temperature have not been altogether successful. For example, conventional prior art burners have been installed beneath griddle plates in open communication with each other and sharing secondary burner air; so that the combined flames from a plurality of burners heats the griddle plate so generally that heat absorption thereto is inherently uniform and cannot be isolated to any degree of satisfaction. Therefore, to shut down one burner of a prior art griddle stove does not have the desired effect of appreciably reducing temperature in any selected area of the griddle, since the secondary burning of gases is distributed throughout an open combustion area coextensively beneath the griddle plate. It is a general object of this invention to isolate the effect of individually controllable burners and to separate combustion of each burner from the other. With the present invention selected areas of a griddle plate can be subjected to individual burner control.

Griddles of the type under consideration are heated by a plurality of underlying burners supplied with a primary air and gas mixture and operating in an open combustion chamber supplied with secondary combustion air. In the prior art griddle stoves the burners share a common combustion chamber beneath the griddle plate, and the distribution of heat is inherently general and uniform and in no sense isolated to any particular area of the griddle. It is an object of this invention to manifold combustion chambers and with each burner in a separate combustion chamber so that isolated operation of each burner is made possible. With the present invention, elongated burners are confined between walls sealed with the underside of the griddle plate, there being a plurality of burners and said complementary walls disposed in parallel relation with manifold combustion chambers established thereby and discharging into a common flue. It is, therefore, made possible to heat an area of the griddle plate overlying one or more burners and their complementary combustion chamber or chambers to a different top heat than that of an adjacent area of the griddle plate overlying another one or more burners and their complementary combustion chamber or chambers.

The prior art utilizes gas burners and radiants for the distribution of heat beneath griddle plates, but generally for uniform coextensive heat distribution, as distinguished from the isolation of distinct heat areas at different temperature. Consequently, prior art griddle stoves are characterized by open secondary combustion chambers without any suggestion of burner chamber separation. It is an object of this invention to seal off one chamber from the other and thereby manifolding the plurality of combustion chambers which discharge into and through a common flue. With the present invention, the griddle plate rests upon seals established by wall ridges coextensive with the burner combustion chambers.

Radiant heat and effective concentration of heat to the underside of the griddle plate is of economic concern, and it is an object of this invention to provide for controlled secondary air and flame support conductive to heat concentration and radiancy from reflective combustion chamber walls. With the present invention, the walls which complement the burners establish separate intake plenums for the supply of secondary air to opposite sides of the burner, and the walls also establish combustion chambers of upwardly divergent cross section so as to spread the generation of heat over a widened but restricted area of the griddle plate. The walls forming the combustion chamber are reflective heat absorbing radiants, and they efficiently direct heat to the overlying area of the griddle plate. A feature of this burner and combustion chamber combination is the concentration of heat from burner ports disposed at opposite sides of the elongated burner, at the transition plane between the secondary air intake plenum and the isolated combustion chamber sealed with the underside of the griddle plate.

Griddle plates are of heavy metal, a usual plate being one inch in thickness, and heat applied at the underside of the plate is conducted throughout the plate. Since it is the purpose of this invention to isolate distinct areas of the plate to operate at different temperatures, it is also an object of this invention to isolate areas of the plate per se, by restricting the conduction of heat from one area thereof to another. In practice, the body thickness of the plate is substantially reduced between adjoining areas of the plate, thereby isolating plate areas one from the other.

SUMMARY OF THE INVENTION

This invention is directed to improvements in a top burner range or the like and particularly with griddle plate stoves wherein a plurality of burners underlie the griddle plate. The burners are fired with a mixture of primary air and gas, and each burner is confined to a combustion chamber supplied with secondary combustion air from a plenum. The isolation of the burners within separate combustion chambers is complete with respect to the underside of the griddle plate, there being sealed engagement of the combustion chamber walls with the underside of the griddle plate. In accordance with this invention, the combustion chambers are said to be manifolded and they are individually fired and discharge into a common flue; though they could discharge through separate flues. The burners are of straight elongated tube form with upwardly directed ports discharging the primary air-gas mixture at the plane of joinder between a lower intake plenum supplying secondary air and the upper combustion chamber where heat generation and radiation occurs. The opposite intake plenum walls are spaced from and parallel with the opposite sides of the burner tube, so as to supply adequate secondary air at the primary flame. The opposite side walls of the combustion chamber continue from the plenum side walls and diverge as they extend upwardly to seal with the underside of the griddle plate.

Accordingly, there is a conventional vertical space between the burner and the underside of the griddle plate, and it is in this space that there is heat concentration due to the confinement within the radiant walls of the combustion chamber. In the preferred embodiment, the burner and combustion chamber configurations are bilaterally symetrical in cross section. That is, the burner tube is ported at opposite sides so as to discharge two spaced primary flames at the plane of joinder where the intake plenum supplies the combustion chamber with secondary air. As a result of the configuration shown and described there is an elongated central area of heat concentration above the burner and coextending with the length of the burner tube, said heat concentration occuring as a result of the commingling of the opposite flames and enhanced by the simultaneous radiant heat from the reflective radiant walls of the combustion chamber.

DRAWINGS

The various objects and features of this invention will be fully understood from the following detailed description of the typical preferred form and application thereof, throughout which description reference is made to the accompanying drawings, in which:

FIG. 1 is an exploded perspective view exposing the plurality of secondary air intake plenums and burner radiants of the present invention.

FIG. 2 is an enlarged sectional view of a burner-combustion chamber sub-combination removed from the stove, and showing the isolation of secondary air intake.

FIG. 3 is an enlarged detailed sectional view of one of the plurality of burners, and showing the control of primary air thereto.

FIG. 4 is an enlarged longitudinal sectional view taken as indicated by line 4—4 on FIG. 1, showing the assembly of the stove and burner-combustion chamber of the present invention.

FIG. 5 is an enlarged transverse sectional view taken as indicated by line 5—5 on FIG. 1, showing the assembly of the stove and the plurality of burner-combustion chambers of the present invention.

FIG. 6 is an enlarged fragmentary view of the combustion chamber radiants sealed with the griddle plate, and showing the accomodation of a thermostat bulb.

FIG. 7 is a transverse sectional view similar to a portion of FIG. 5, showing an improved griddle plate configuration with reduced thickness between isolated plate areas. And, FIGS. 8, 9 and 10 are enlarged detailed sectional views of the reduced areas of the plate, FIG. 8 showing the reduced thickness or slot and radiant seal, FIG. 9 showing the locating tabs, and FIG. 10 showing the thermostat bulb.

PREFERRED EMBODIMENT

The griddle stove shown in the drawings is comprised of a housing H within which the burners B and related combustion chambers C operate beneath a griddle plate G. The housing H has a bottom 10 exposed to surrounding atmosphere for the supply of secondary combustion air, as later described, and is shown supported by legs 11 at each of its four corners. The housing H is horizontally disposed and has upstanding side walls 12, a back wall 13 and a front wall 14. Spaced behind the front wall 14 and above the bottom 10 and between the side walls 12, there is a partition wall 15 establishing an intake plenum P1 for primary combustion air. The gas supply manifold 16 and gas valves 17, with thermostat control when required, are accomodated within the plenum P1, with the valve and/or thermostat control stems projecting through the front wall 14. The plenum P1 is open to surrounding atmosphere for the supply of primary combustion air. Characteristically, the housing presents an upwardly open interior for the accomodation of the burners B and combustion chambers C, and it is closed by the placement of the griddle plate G rested thereon, as shown. The griddle plate G is carried by the top edges of the housing walls 12–14.

The griddle plate G is a heavy metal plate having a flat top surface 20 for food processing, and a bottom underside surface 21 to rest upon the plane of the top edges of the housing walls 12–14. The front edge of the griddle plate G terminates at a trough 22 with a discharge spout 23 for disposing of food debris. And, the back edge of griddle plate G terminates at a vertically disposed flue 24 extending coextensively of the back wall 13 and between the side walls 12 of the housing. The flue is open top and bottom to pass the thermal convection flow of exhaust gasses from the interior of housing H and from beneath the griddle plate G. In practice, the griddle plate G is one inch thick steel plate to which the trough 22, discharge spout 23, flue 24 and side walls 25 of stainless steel are welded, as shown.

In accordance with this invention, there is at least one burner B, a gas burner of elongated tube form extending between the front wall 14 and the back wall 13, and preferably a plurality of such burners. With each burner B there is a complementary combustion chamber C comprised of a baffle 30 extending along each opposite side of the burner B to establish an inlet plenmum P2 for admission of secondary combustion air, A heat reflective radiant 31 is carried by the baffle 30 and is sealed with the underside 21 of the griddle plate G. In practice, each combustion chamber C extends from the partition wall 15 to the back wall 12, and with the griddle plate G in place it is a closed chamber except for the flue 24 opening therefrom at the back wall 13, and except for inlet openings 32 through a bottom 10' thereof and into the plenum P2. As shown, there is a series of openings 32 extending from partition 15 to back wall 13 beneath each burner B and midway between the opposite baffles 30 that embrace the burner. The openings 32 admit secondary combustion air through opening 32 and into plenum P2.

The intake plenum P2 is formed by the baffles 30 that extend parallel one with the other and one at each side of the burner B. The baffles 30 extend vertically from the bottom 10' and terminate at a horizontal plane a at or immediate to the plane at which the ports of the burner B discharge the primary combustion mixture, as will be described. It is at this plane a that the radiants 31 diverge upwardly, it being preferred that the baffles 30 and radiants 31 are integral continuations connected by a bend line at the plane a of joinder thereof. In practice, the radiants are angularly turned approximately 45°, so that the inclusive angle of divergence is approximately 90°. The angular relationship can vary as circumstances require. It is significant that there is space between the emission of primary mixture from the burner ports and the bottom underside 21 of the griddle plate G, and it is also significant that the divergence of the radiants 31 commences at plane a substantially coincidental with the emmission of primary mixture from the burner ports.

The divergent radiants 31 are each a flat sheet of metal capable of becoming super heated without excessive deformation, and not subject to collapse or structural failure. The uppermost ridge of each radiant is reinforced by ridge flange 33 that is turned inwardly and upwardly so that its edge engages the underside 21 of the griddle plate G. In practice, the baffle 30 and integral radiant 31 are of thin sheet metal, such as stainless steel, that is resilient and yielding to the weight of the heavy griddle plate. Accordingly, the flange 33 seals with the underside 21 of the griddle plate G.

A feature of this invention is the plurality of the burner B and combustion chamber C sub-combinations, each as above described, and which complement each other. Two or more sub-combinations and as shown five sub-combinations are employed as shown, adjacently related in cooperative combination wherein each sub-combination is isolated from the other insofar as controlled combustion is concerned. As shown, the ridge flanges 33 of the adjacent sub-combinations come together where they are joined as by welding to form a stable apex at 34. The baffle 30 and radiant 31 walls deflect and depress when the griddle plate G is applied to effect the seal with flanges 33. A feature is the triangular cross sectional space that is established by the flanges 33, which accomodates the bulb 35 of a thermostat sensing the temperature at the underside 21 of the griddle plate G. The bulb 35 is isolated from the flanges 33 by a packing 36, so that the bulb is sensitive principally to the griddle plate temperature. Another feature is the exclusion of exterior space beneath the divergently spreading radiants and outside the plenum P2. That is, there is an occluded chamber 38 outside the combustion chamber C and the plenum P2, and between the chambers C when the sub-combinations are combined adjacently. These occluded chambers 38 are downwardly open and accessible at the plane of bottoms 10' and bottom 10 of housing H, for cleaning, and they act as heat accumulators.

In accordance with this invention, the burner B involves a straight elongated tube 40 with a row of burner ports 41 opening therefrom at or substantially coincidental with the aforementioned plane a. The burner ports 41 open upwardly into the combustion chamber between the radiants 31, so that a primary flame b rises toward the underside 21 of the griddle plate G. The mixture of gas and primary air is by means of a shutter 42 that supports an end portion of the tube 40 that projects through the partition wall 15 and into the primary pelnum P1. The other end of the tube 40 is supported by a bracket 43, through a locating pin 44; all for ease of assembly and disassembly. The burner ports 41 are shown as a series of transverse slots, the series being substantially coextensive with the length of the tube 40.

In accordance with the preferred form of this invention, the burner tube 40 and burner port 41 configuration is bilaterial in cross section, there being a pair of spaced parallel series of burner ports 41, as shown, the burner ports 41 discharge at a 45° angle above and substantially parallel with the surface of the radiant which it faces, at each side of the burner tube. Again, this pair of burner ports 41 is disposed to discharge at the plane a; upwardly and outwardly at opposite sides of the tube 40, as shown. As clearly shown, secondary combustion air rises by convention at opposite sides of the burner tube 40 to supply the secondary combustion surrounding each of the primary flames b where there is heat concentration, the two flames converging upwardly and commingling in a secondary concentration zone c reaching upwardly so as to occur immediately beneath the underside 21 of the griddle plate G. Accordingly, there are at least two and preferably three heat concentration zones that are reflected by the radiants 31 which absorb and reflect heat therefrom. Firstly, the primary flame concentration b is radiated and reflects upwardly by the heat absorbing radiants 31; and secondly, the secondary flame concentration c is also radiated and reflected upwardly by the heat absorbing radiants 31. The combustion chamber C is closed by sealed engagement of the radiants with the underside 21 of the griddle plate G, and consequently the heat absorption is upward and into the heat-sink of the massive griddle plate G.

Referring now to FIG. 7 through FIG. 10 of the drawings, the griddle plate G' is improved with a reduced thickness where the radiants seal therewith, in order to establish the isolated combustion chambers C. The reduced thickness of the griddle plate G' commensurately reduces the thermal conduction between adjacent cooking areas thereof, so that more effective heat isolation is attained. A feature of this form of the invention is the cooperative effect of the above described radiant seal and griddle area isolation by means of the reduced thickness between its adjacent cooking areas. As shown, the reduced heat restriction thickness is a slot or channel 50 in the underside surface 21 of the griddle plate, a slot or channel in alignment with and embracing the joinder of adjacent radiants 31' at their apex 34'. In practice, the griddle plate G' (G) is one inch thick, and the slot or channel 50 is ¾ inch deep for the reception of the upstanding flanges 33' of the radiants, the slot or channel 50 being, for example, ¾ inch wide and coextensive with the radiants to receive the upstanding flange 33' thereof. The remaining griddle plate thickness at its top surface 20 conducts about 25% of the heat that its full thickness would conduct, thereby contributing substantially to heat isolation between adjacent areas thereof.

As shown in FIG. 7, the flanges 33' are vertically disposed and joined in flat engagement one with the other, and they are free standing in the slot or channel 50 to form a two stage labyrinth seal; whether touching the griddle plate or not. As shown in FIG. 8, the flanges 33' are divergently separated by a space 51 therebetween to form a three stage seal. As shown in FIG. 9 the free standing flanges 33' are provided with a spacer or tabs 52 that locate the flanges 33' symetrically within the confines of the slot or channel 50. As shown in FIG. 10, the flanges 33' are divergent at their upper edges 53 in order to accomodate the thermostat bulb 35. And, as shown in FIG. 10, the flanges 33' can be isolated and sealed within the slot or channel by means of a packing 36.

From the foregoing it will be understood that I have provided a manifold of sub-combination burner-combustion chambers sealed with the underside of a griddle plate, whereby selected areas thereof can be operated at raised or lowered temperature, as circumstances require. Primary combustion air is isolated from secondary combustion air and the secondary combustion air of each combustion chamber is separated from the other, each burner operating in an isolated combustion chamber separately exposed to the underside of the griddle plate. Primary combustion air is supplied in a conventional manner through the shutter that controls each burner. Adequate secondary combustion air is supplied through the restrictive plenum to rise by convection next adjacent to the rows of burner ports at opposite sides of the elongated burner. Secondary combustion occurs with a comingling of symetrically arranged flames, there being heat concentration in both the primary flames and the commingled secondary flames. There is a common plane where the secondary intake plenum terminates and the baffle thereof continues into a radiant at each side of the burner, and one radiant divergent from the other, and this is the plane at which the burner ports discharge the primary air gas mixture. The radiants of each burner-chamber sub-combination seal at the underside of the griddle plate, for flue discharge only at the back of the stove. Each of said sub-combinations is controlled for the desired heat that is radiated into the mass of the griddle plate, and all are simultaneously operative in the overall combination for a controlled heat effect as may be required.

Having described only a typical preferred form and application of my invention, I do not wish to be limited or restricted to the specific details herein set forth but wish to reserve to myself any modifications or variations that may appear to those skilled in the art as set forth within the limits of the following claims.

I claim:

1. In a gas stove, the combination of a plurality of adjacent burner-combustion chambers and each which directly heat isolated portions of a griddle plate, and each including:

a single straight elongated burner tube supplied by control means with gas and with primary combustion air from a primary air intake plenum, and having burner ports discharging therealong at a common plane spaced below the griddle plate, a pair of straight and parallel baffles below the burner and extending upward to said plane and closely spaced from the opposite sides of the burner and forming a secondary air intake plenum supplying secondary combustion air to the burner, a pair of radiants diverging upwardly from the pair of baffles at said plane and each extending to a seal at the underside of the griddle plate and forming an isolated combustion chamber therebetween, the plurality of burner-combustion chambers being manifolded in parallel relation to each other and with the next adjacent radiants of each pair of burner-combustion chambers being convergent to meet at the underside of the griddle plate, the secondary intake plenums and the combustion chambers of the plurality of burner-combustion chambers being in open communication at said common plane and all isolated by a wall from the primary air intake plenum, and the manifolded combustion chambers being open at one end to a flue.

2. The combination of a plurality of burner-combustion chambers in a stove as set forth in claim 1, wherein each burner has a series of burner ports discharging at said common plane, and wherein the baffles and radiants are symmetrically spaced from sides of each burner tube to supply secondary air to the series of burner ports.

3. The combination of a plurality of burner combustion chambers in a stove as set forth in claim 2, wherein the secondary air intake plenums and combustion chambers are each closed at one end by a partition wall separating the primary air intake plenum therefrom, and each open at the other end to the flue.

4. The combination of a plurality of burner-combustion chambers in a stove as set forth in claim 3, wherein the next adjacent convergent radiants are joined at a ridge.

5. The combination of a plurality of burner-combustion chambers in a stove as set forth in claim 1, wherein each burner has a series of burner ports discharging at opposite sides thereof and at said common plane, and wherein the baffles and radiants are symmetrically spaced from opposite sides of each burner tube to supply secondary air to the opposite series of burner ports.

6. The combination of a plurality of burner-combustion chambers in a stove as set forth in claim 5, wherein the secondary air intake plenums and combustion chambers are each closed at one end by a partition wall separating the primary air intake therefrom, and each open at the other end to the flue.

7. The combination of a plurality of burner-combustion chambers in a stove as set forth in claim 1, wherein the baffles forming each secondary air intake plenum extend upwardly from a bottom with openings for determined intake of adequate secondary combustion air.

8. The combination of a plurality of burner-combustion chambers in a stove as set forth in claim 1, wherein the radiants forming the combustion chambers extend divergently upward and are resilient and in yielding engagement with and to form the seal at the underside of the griddle plate.

9. The combination of a plurality of burner-combustion chambers in a stove as set forth in claim 1, wherein the radiants forming the combustion chambers extend outwardly and divergently upward to an inwardly turned flange, the inwardly turned flanges of next adjacent convergent radiants forming a space, and a thermostat sensor accomodated in said space.

10. The combination of a plurality of burner-combustion chambers in a stove as set forth in claim 9, wherein the next adjacent convergent radiants are joined at their inwardly turned flanges to form a ridge from which the flanges project oppositely to form said space 11. The combination of a plurality of burner-combustion chambers in a stove as set forth in claim 9, wherein the next adjacent convergent radiants are joined at their inwardly turned flanges to form a ridge and said flanges supporting the griddle plate.

12. The combination of a plurality of burner-combustion chambers in a stove as set forth in claim 1, wherein the seals at the underside of the griddle plate are each comprised of a channel in the underside of the griddle plate and a coextensive flange upstanding from a radiant and entering the channel to form the seal within the channel.

13. The combination of a plurality of burner-combustion chambers in a stove as set forth in claim 1, wherein the seal at the underside of the griddle plate are each comprised of a channel in the underside of the griddle plate and a coextensive flange upstanding from a radiant and aligned therewith in spaced relation within the channel to form a labyrinth as the seal.

14. The combination of a plurality of burner-combustion chambers in a stove as set forth in claim 13, wherein the flange upstanding from said radiant is located in alignment within the channel by a spacer engageable therewith and within the channel.

15. The combination of a plurality of burner-combustion chambers in a stove as set forth in claim 1, wherein the seals at the underside of the griddle plate are each comprised of a channel in the underside of the griddle plate and a coextensive flange upstanding from a radiant and entering the channel to form a seal, and packing positioning the flange within the channel and perfecting the seal.

16. The combination of a plurality of burner-combustion chambers in a stove as set forth in claim 15, wherein the upstanding radiants forming the combustion chambers extend outwardly and divergently upward in the channel to accomodate a thermostat sensor in said channel.

17. The combination of a plurality of burner-combustion chambers in a stove as set forth in claim 1, wherein the seals at the underside of the griddle plate are each comprised of a channel in the underside of the griddle plate and coextensive flanges of adjacent radiants engaged with each other and divergently upstanding in spaced relation to and within the channel to form a multi-labyrinth as the seal.

18. The combination of a plurality of burner-combustion chambers in a stove as set forth in claim 1, wherein the seals at the underside of the griddle plate are each comprised of a channel in the underside of the griddle plate thereby reducing its thickness and a coextensive flange upstanding from a radiant and entering the channel to form the seal, the reduced thickness of the griddle plate commensurately restricting thermal conductivity between said isolated portions thereof.

* * * * *